United States Patent [19]
Yamamoto et al.

[11] 4,331,627
[45] May 25, 1982

[54] ALUMINA SINTERED PRODUCTS AND PROCESS FOR THEIR PRODUCTION

[75] Inventors: Yoshihiro Yamamoto; Kenji Sakurai; Hiroshi Tanaka, all of Nagoya, Japan

[73] Assignee: NGK Spark Plug Co., Ltd., Aichi, Japan

[21] Appl. No.: 97,626

[22] Filed: Nov. 27, 1979

[30] Foreign Application Priority Data

Nov. 28, 1978 [JP] Japan .................................. 53-145999

[51] Int. Cl.³ ...................... C04B 35/64; C04B 35/50; C04B 35/44
[52] U.S. Cl. ..................................... 264/332; 51/309; 501/152; 501/153
[58] Field of Search ................ 106/73.4, 73.2; 264/65, 264/332; 51/309; 501/152, 153

[56] References Cited

U.S. PATENT DOCUMENTS

| | | | |
|---|---|---|---|
| 2,695,628 | 11/1954 | Wheildon | 106/73.4 |
| 3,141,786 | 7/1964 | Bugosh | 106/73.4 |
| 3,377,176 | 4/1968 | Wolkodoff et al. | 106/65 |
| 3,886,254 | 5/1975 | Tanaka et al. | 51/309 |
| 3,905,845 | 9/1975 | Kobayashi et al. | 106/73.4 |
| 4,063,908 | 12/1977 | Ogawa et al. | 51/309 |
| 4,182,972 | 1/1980 | Kaneno et al. | 106/73.4 |

*Primary Examiner*—Mark Bell
*Attorney, Agent, or Firm*—Sughrue, Mion, Zinn, Macpeak and Seas

[57] ABSTRACT

A process for producing an alumina sintered product is disclosed wherein the starting alumina mixture contains about 0.01 to 0.55% by weight of MgO and 0.5 to 5.5% by weight of $Y_2O_3$. The process yields a sintered product having a porosity on the order of less than 0.1% by volume and an average crystal grain size of about 2 microns or less and is particularly suitable for use in high speed microfinish cutting.

6 Claims, 1 Drawing Figure

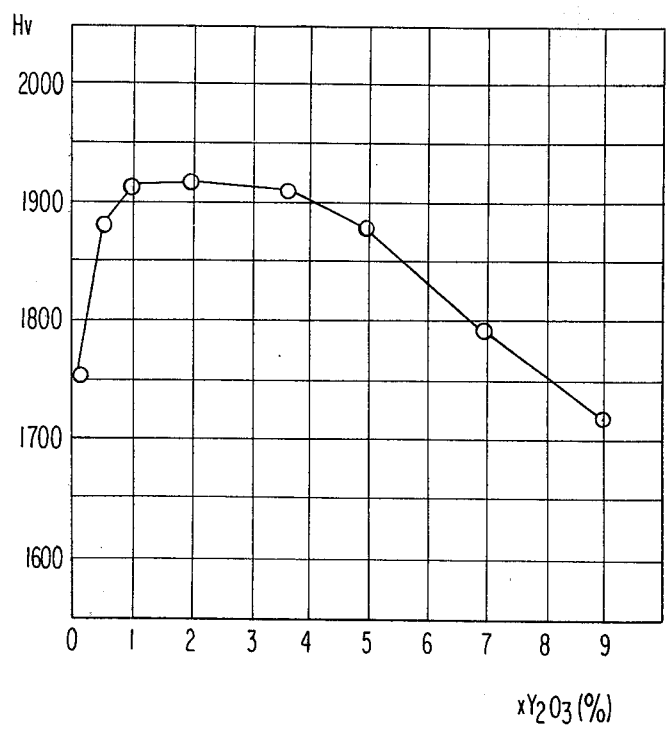

ALUMINA SINTERED PRODUCTS AND PROCESS FOR THEIR PRODUCTION

BACKGROUND OF THE INVENTION

1. Field of the Invention

The present invention relates to a process for producing ceramic sintered products having high strength and, more particularly, it relates to alumina sintered products for use as cutting tools or other abrasion resistant parts.

2. Description of the Prior Art

Hitherto for, as sintering additives for alumina ceramics having high strength used as ceramic tools and other abrasion resistant parts, MgO, NiO, CaO, $SiO_2$, $ZrO_2$ and the like have been known. Of these, MgO has been the most generally used. Recently, however, the requirements of ceramic tools have become more demanding and tools having greater strength and higher abrasion resitance are required. Only alumina-carbide tools such as an alumina-titanium carbide have been used as ceramic tools for high speed cutting or heavy cutting, etc., because conventional high purity alumina ceramic tools possessing an alumina content of about 95 wt% or more have poor antibreaking property and abrasion resistance. However, alumina-titanium carbide tools, for example, suffer from abnormal abrasion during microfinish cutting at high-speeds, cutting of hard materials, cutting of ductile cast iron, etc. due to the influence of the TiC component contained therein. Accordingly, it has been desired to develop tools which do not contain a TiC component or which are not adversely affected by the TiC component.

The so-called conventional high purity alumina ceramics have an average crystal size of about $3\mu$ or more and a porosity of about 0.1% by volume, when produced by a hot press process. If it is intended to limit the porosity to about 0.1% by volume or less when MgO is added, higher sintering temperatures are required and, consequently, the crystals naturally grow and the average crystal grain size exceeds about 10 microns. Thus, it is extremely difficult to achieve the porosity limitation. For example, alumina-TiC tools have a porosity of about 0.1% by volume or less and the average crystal size of about 1 to $2\mu$.

SUMMARY OF THE INVENTION

Accordingly, one object of the present invention is to provide a novel process which can overcome the above shortcomings of conventional high purity alumina sintered products.

Another object of the present invention is to provide a process for producing alumina sintered products which comprises hot pressing a starting alumina mixture containing about 0.01 to 0.55% by weight of MgO and about 0.5 to 5.5% by weight of $Y_2O_3$ as grain growth inhibitors at a temperature of about 1,400° to 1,600° C. and a pressure of about 50 to 2,000 kg/cm².

BRIEF DESCRIPTION OF THE DRAWING

The FIGURE is a graph showing the relationship between the $Y_2O_3$ content in a $[100-(x+0.2)]Al_2O_3$-$0.2MgO$-$xY_2O_3$ ceramic which is one example of the present invention and the Vickers hardness (Hv) of the alumina sintered products. The vertical axis is the hardness and the horizontal axis is the $Y_2O_3$ content (% by weight).

DETAILED DESCRIPTION OF THE INVENTION

Generally, the strength of hot pressed alumina sintered products increases as the porosity decreases and the average crystal size becomes small. Sintering at a high temperatures is required to decrease porosity, but the grain size tends to grow at these temperatures. By adding MgO it is possible to inhibit grain growth but the sintering temperature can not be reduced to a level at which the grain growth is limited to about $2\mu$ or less because higher temperatures are required to decrease the porosity. Further, when MgO is added in a large amount, the sintering temperature tends to increase again. In this case, coarse $Al_2O_3$ particles formed in the interior of the sintered product (i.e., a region containing relatively large crystal particles) cause abnormal growth of the crystal particles. Thus there is a dilemma. In this respect, the following experiment shows the difficulty in increasing the strength of sintered products by the addition of MgO alone.

The effect of MgO was examined using the finest α-alumina commercially available (average particle size: $0.2\mu$, and purity: 99.9% by weight). It was found that it is necessary to sinter at the temperatures shown in Table 1 in order to make a product having a porosity of about 0.1% by volume or less using a starting material containing MgO of 0, 0.02 or 1% by weight of a hot press at a pressure of 200 kg/cm², and the resulting products are particles having a crystal grain size of about $2\mu$ or more.

TABLE 1

| MgO Content (% by weight) | Hot Press Temperature (°C.) | Crystal Size ($\mu$) | Note |
| --- | --- | --- | --- |
| 0 | 1,650 | 80 | Relatively uniform particle size |
| 0.2 | 1,450 | 2.6 | Particles of 10 to 20 $\mu$ are slightly contained. |
| 1 | 1,580 | 3.9 | Particles of 10 to 20 $\mu$ are considerably contained. |

The results in Table 1 clearly show that an increase in the strength of the alumina sintered products is difficult to obtain by the addition of MgO alone.

In accordance with the present invention the crystal size in alumina sintered products can be limited to about $2\mu$ or less by the addition of $Y_2O_3$ together with a small amount of MgO.

MgO is used in an amount of about 0.01 to 0.55% and preferably about 0.02 to 0.5% by weight. $Y_2O_3$ is used in an amount of about 0.5 to 5.5% and preferably about 1 to 5% by weight. The sintering temperature is about 1,400° to 1,600° C., preferably about 1,450° to 1,500° C. The hot press pressure is about 50 to 2,000 kg/cm², preferably about 200 to 2,000 kg/cm².

When the amount of $Y_2O_3$ added is in the range of about 0.5 to 5% by weight, a significant variation of the crystal size is not observed. The amount specifically added is determined mainly in view of the hardness of the sintered products. Further, the specific amount of MgO added is determined primarily in view of the strength and crystal size of the sintered products.

Additives may be added to the starting materials used to prepare the sintered products of the present invention as long as they do not interfere with the function of MgO and $Y_2O_3$. Suitable additives are NiO and $ZrO_2$.

Some representative examples in the above-described ranges are shown in the following Table 2 where the hot press temperature in each run was selected to have the porosity of about 0.05 to 0.06%. Further, the relationship between the amount of $Y_2O_3$ and Vickers hardness (Hv) of the sintered products where the amount of MgO is maintained constant in the above-described range is shown in the FIGURE.

TABLE 2

| Amount of MgO | Amount of $Y_2O_3$ | Hot Press Temperature | Crystal Size |
|---|---|---|---|
| (% by weight) | (% by weight) | (°C.) | ($\mu$) |
| 0.02 | 2 | 1,460 | 1.0 |
| 0.2 | 2 | 1,450 | 0.9 |
| 0.5 | 2 | 1,470 | 1.3 |
| 0.6* | 2 | 1,500 | 2.0 |

*Outside the present invention

The alumina sintered products in the above-described range of the present invention comprise a major portion of $\alpha$-alumina, and small amounts of $Y_3Al_2(AlO_4)_3$ and $MgAl_2O_4$. It is believed that the formation of $Y_3Al_2(AlO_4)_3$ prevents the abnormal growth of alumina crystal particles.

The present invention will now be explained in greater detail by reference to the following example. Unless otherwise indicated, all percentages, parts, ratios and the like are by weight.

EXAMPLE

Commercially available $\alpha$-alumina having an average particle size of $0.2\mu$ and a purity of 99.9% was mixed with pure MgO and $Y_2O_3$ in the amounts shown in Table 3 below. The mixture was kneaded for 10 hours using a pot mill made of high purity alumina and balls made of the same and dried to product a raw material. This raw material was hot pressed using a graphite mold at temperatures of 1,450° to 1,500° C. and a pressure of 200 kg/cm² for 0.5 hours. The alumina sintered product thus obtained was cut by a diamond wheel to produce a sample for testing transverse rupture strength, having dimensions 4(thickness)×8-(width)×25(length) mm and a rectangular tip 12.7×12.7×4.8 mm. These samples were evaluated as follows.

Measurement of Physical Characteristics:

Using a sample 4×8×25 mm, a transverse rupture strength test was carried out with the span length between fulcrums being 20 mm according to JIS B 4104. A fragment obtained upon breaking under the test was abraded to form a mirror surface, and Vickers hardness (Hv) was measured. The other fragment was observed under a microscope at 200 magnification, and porosity (% by volume) was determined. The crystal size of the broken face was observed by a Scanning Electron Microscope (SEM) of 2,000 magnifications.

Measurement of Cutting Characteristics

A cast iron rod (JIS FC 20, Hv: 180) was cut by the rectangular tip 12.7×12.7×4.8 mm (coner R: 0.8 mm) under the following conditions, and the degree of abrasion was measured. The material abraded had an outside diameter of 120 mm and a length of 400 mm wherein grooves having the width of 5 mm were cut in turn in the axial direction so as to form convex parts having the width of 15 mm.

Cutting speed V=300 m/min. Cutting depth=1.0 mm.

Conveying speed f=0.31 mm/rev.

Evaluation was made by the value of frank wear $V_B$ at 300 cuts.

The results obtained are shown in Table 3 below. For the sake of comparison, the results obtained for a commercially available high purity $Al_2O_3$ ceramic tool and a commercially available $Al_2O_3$-TiC tool tested under the same conditions are also shown in Table 3.

TABLE 3

| Sample | Additives MgO (%) | Additives $Y_2O_3$ (%) | Antibreaking Force (kg/mm) | Vickers Hardness (kg/mm²) | Porosity (vol. %) | Average Crystal Size ($\mu$) | Cutting Life $V_B$ (mm) | Notes |
|---|---|---|---|---|---|---|---|---|
| A | 0.02 | 2 | 68 | 1,905 | 0.04 | 1.0 | 0.16 | |
| B | 0.2 | 2 | 73 | 1,920 | 0.03 | 0.9 | 0.14 | |
| C | 0.2 | 5 | 70 | 1,880 | 0.06 | 1.0 | 0.17 | |
| D | 0.5 | 2 | 65 | 1,865 | 0.06 | 1.3 | 0.18 | |
| X | 0.6 | 2 | 52 | 1,790 | 0.11 | 2.0 | 0.29 | Comparison |
| Y | 0.2 | 7 | 60 | 1,795 | 0.08 | 1.2 | 0.28 | Comparison |
| Z | 0.2 | 0 | 50 | 1,755 | 0.09 | 2.6 | 0.29 | Comparison |
| Commericially available high purity $Al_2O_3$ | | | 40 | 1,705 | 0.13 | 3.2 | 0.31 | MgO 0.6%; CaO 0.4% |
| Commercially available $Al_2O_3$ - TiC | | | 82 | 2,050 | 0.02 | 1.3 | 0.35 | TiC 30% |

While the invention has been described in detail and with reference to specific embodiments thereof, it will be apparent to one skilled in the art that various changes and modifications can be made therein without departing from the spirit and scope thereof.

What is claimed is:

1. In a process for producing an alumina sintered product by sintering a starting alumina mixture containing sintering assistants using a hot press, the improvement wherein the starting alumina mixture consists essentially of alumina and about 0.01 to 0.55% by weight of MgO and about 1 to 5% by weight of $Y_2O_3$ as grain growth inhibitors and the mixture is hot pressed at a temperature of about 1,400° to 1,600° C. and pressure of about 50 to 2,000 kg/cm².

2. The process of claim 1, wherein the amount of MgO is about 0.02 to 0.5% by weight.

3. The process of claims 1 or 2, wherein the alumina sintered product has a porosity of about 0.1% by volume or less and an average crystal size of about $2\mu$ or less.

4. The process of claim 1, wherein the amount of MgO is about 0.02 to 0.5% by weight, the amount of $Y_2O_3$ is about 1 to 5% by weight, and the mixture is hot pressed at a temperature of about 1,450° to 1,500° C. at a pressure of 200 to 2,000 kg/cm².

5. The process of claim 1, wherein said alumina is alpha-alumina of a purity of 99.9%.

6. The process of claim 1, wherein the alumina sintered product consists essentially of alpha-alumina, $Y_3Al_2$-$(AlO_4)_3$ and $MgAl_2O_4$.

* * * * *